Patented May 7, 1940

2,200,221

UNITED STATES PATENT OFFICE 2,200,221

MANUFACTURE OF FLUORESCENT LAMPS

Carl F. Swinehart, Cleveland Heights, and Herman C. Froelich, Cleveland, Ohio, assignors to The Harshaw Chemical Company, Elyria, Ohio, a corporation of Ohio No Drawing. Application June 5, 1939,
Serial No. 277,456

19 Claims. (Cl. 176—122)

This invention relates to manufacture of fluorescent lamps such as consist of gas filled, glass tubes, having electrodes at the ends and inner coatings of fluorescent material, and particularly to conditioning the electrodes and fluorescent coatings of such lamps by passing current therethrough. Such conditioning is generally known as bombarding.

A common bombarding method consists in evacuating the tube to a pressure of the order of 15 to 12 mm. Hg., then passing current therethrough until the temperature on the external surface of the tube is high enough to char paper, further evacuating to a pressure of the order of 2 to 1½ mm. Hg., and again passing current until the electrodes are red hot.

Following the usual bombarding procedures, such as described above, in the production of fluorescent tubes or lamps coated with green, white, gold, pink, and other fluorescent pigments, we have experienced, in varying degree, a tendency to decomposition of the pigment with consequent diminution in brilliance. This effect is especially marked in certain cadmium pigments, such as cadmium silicates, tungstates and borates, and mixed salts of cadmium with, for example, magnesium. In some cases, black deposits of metallic cadmium are produced.

We have now discovered that the decomposition of the fluorescent oxy-compounds of cadmium and other metals can be largely prevented by bombarding in dry oxygen or equivalent oxidizing gas. By the term "dry," we mean substantially free from water vapor.

Our experiments indicate that the above described tendency to decomposition is least in pure oxygen and increases as oxygen is diluted with inert gas. The tendency is marked in the case of air, which is roughly 21 per cent oxygen by volume and 79 per cent nitrogen and other gases. In pure helium, the tendency is more marked than in air. The presence of water vapor is highly undesirable, since the decomposing effect is even greater, where bombardment is carried out in a tube containing mainly water vapor than in one containing only helium.

Our invention, therefore, consists in bombarding the fluorescent coatings and electrodes of fluorescent lamps or tubes in absence of water vapor and under conditions more highly oxidizing than an atmosphere of dry air.

In practice we prefer to subject a tube to a high vacuum while applying external heat and thereby remove water vapor and any other volatile impurities. The external heating is preferably of the order of 60° to 120° C. Dry oxygen is then admitted to a pressure, preferably, of the order of 12 to 15 mm. Hg. or as high as the transformer will allow, in most cases not less than 10 nor more than 20 mm. Hg. Current is then passed through the tube for a few seconds to heat it internally. The oxygen is then pumped out and fresh oxygen admitted and current passed as before. Usually it will not be necessary to introduce oxygen more than one or twice. The tube is then bombarded until its external surface is hot enough to char paper.

After the above treatment is carried out, the vacuum is reduced to the order of 2 to 1½ mm. Hg. and current passed until the electrodes are red hot, the desired gas, e. g., neon, with or without mercury, is introduced and the tube sealed. Manipulative features of the above described process may be, except as otherwise indicated, the same as when bombardment is in air, that is, standard procedure.

The following experiments will demonstrate the advantage of our new procedure, it being understood that the pigments were all tested as internal coatings on fluorescent lamps.

Cadmium silicate pigment was bombarded in an atmosphere of ordinary air. A few seconds after the current had been turned on the pigment began to break down and turn dark. Upon continued passage of current a strong green-blue light began to fill the tube and by analyzing the light through a spectroscope we were able to identify all major visible cadmium lines. Gradually the breakdown became more complete, the tube became progressively darker and after a short time a mirror coating deposited on the cooler parts of the tube. After cooling, the part containing the mirror was broken off, the metallic coating dissolved in acid and identified chemically as pure cadmium metal. In another tube, in which we did not let the decomposition proceed quite so far, we admitted a little oxygen gas and could demonstrate, by means of a pressure gage, that the oxygen was being absorbed when current was again passed through the tube. Apparently this gas was taken up by the reduced metal previously liberated. Similarly, the breakdown is very rapid, and the formation of cadmium metal can be readily shown, in tubes coated with straight cadmium oxide.

Cadmium silicate was bombarded in dry air, dry helium and dry oxygen, respectively. In the air and helium containing tubes, the blue light, indicative of cadmium vapor, appeared and, in the helium containing tube cadmium metal was deposited as a mirror on the cooler surfaces. The oxygen containing tube remained in perfect condition. The total light from the oxygen containing tube was more than 30% greater than from the air containing tube, as measured by means of a photoelectric cell.

A zinc beryllium silicate, which was bombarded in dry oxygen, gave at least 5% more total light than one bombarded in dry air and showed a marked improvement in color quality.

A calcium tungstate bombarded in dry oxygen and applied to a tube filled with neon gas, gave a pink which was at least 5% stronger than the same pigment applied to a neon filled tube but bombarded in dry air and showed a marked improvement in color quality.

Several samples of zinc silicates which gave poor response when excited with neon gas after bombarding in dry air, gave a good orange-yellow color when bombarded in dry oxygen. The oxygen seems to keep the surface of the pigment crystals clean so as to make it more responsive to the very short ultraviolet excitation of about 700 Å, which prevails in discharges through neon gas. This is also evidenced by the fact that even some zinc silicates turn slightly dark when bombarded in air, but remain perfectly white when bombarded in oxygen. In general, the zinc silicates are the most stable and least sensitive to bombarding procedures. They give good results when bombarded in air. They are improved, however, by bombardment in oxygen and withstand more severe bombarding in oxygen than in air.

Cadmium borate was bombarded in dry oxygen and in dry air, showing marked improvement resulting from the use of oxygen as against air.

No particular ratio of metal oxide to acid radical is essential and various ratios may be used, such as ortho silicates, meta silicates, ratios more acid than meta and more basic than ortho silicates. Similarly, various ratios may be used in the case of tungstates, borates and other fluorescent salts of oxyacids. We may, for example, use a zinc silicate of composition $1.8ZnO.SiO_2$ activated with 1.2% manganese oxide, a cadmium silicate of composition, $CdO.SiO_2$ activated with 2.0% manganese oxide, or a cadmium borate of $CdO.\frac{1}{2}B_2O_3$ activated with 1% manganese chloride.

The above specific examples are illustrative only and are not to be read in a limiting sense.

Having thus described our invention, what we claim is:

1. In the production of fluorescent lamps of the type comprising a sealed tube having spaced electrodes and interiorly coated with fluorescent pigment, the steps of evacuating said tube, externally heating the same to assist in the removal of water vapor from the fluorescent coating, introducing dry oxygen into such tube to a pressure high enough to avoid heating the electrodes to red heat, passing current through said tube until the external surface is hot enough to char paper, reducing the pressure to a point to cause the electrodes to become red hot upon the passage of current and passing current until the electrodes have reached red heat.

2. In the production of fluorescent lamps of the type comprising a sealed tube having spaced electrodes and interiorly coated with fluorescent pigment, the steps of evacuating said tube and externally heating the same to remove water vapor, admitting dry oxygen to a pressure of from 10 to 20 mm. Hg. and passing current until the exterior surface of the tube has reaches a temperature approximating the charring temperature of paper.

3. A process of producing a fluorescent lamp including the step of bombarding a fluorescent coating on an inner surface thereof in an atmosphere of dry oxygen.

4. In a process of manufacturing a fluorescent lamp, the step of bombarding fluorsecent pigment therein in a dry atmosphere more oxidizing than air and at a pressure not exceeding 20 mm. Hg.

5. A process of producing a fluorescent lamp including the step of bombarding a fluorescent coating on an inner surface of such lamp in an atmosphere composed of dry gaseous material more highly oxidizing than air.

6. A process of producing a fluorescent lamp including the step of bombarding a fluorescent coating on an inner surface thereof in a dry atmosphere containing a greater proportion of oxygen than does air.

7. A process of producing a fluorescent lamp comprising bombarding fluorescent material therein in a dry atmosphere more highly oxidizing than air, said fluorescent material being a fluorescent oxy-compound.

8. A process of producing a fluorescent lamp including the step of bombarding a fluorescent coating on an inner surface thereof in an atmosphere of dry oxygen, said fluorescent coating comprising a fluorescent oxy-salt.

9. A process of producing a fluorescent lamp including the step of bombarding a fluorescent coating on an inner surface thereof in an atmosphere of dry oxygen, said fluorescent coating comprising a fluorescent silicate.

10. A process of producing a fluorescent lamp including the step of bombarding a fluorescent coating on an inner surface thereof in an atmosphere of dry oxygen, said fluorescent coating comprising a cadmium containing silicate.

11. A process of producing a fluorescent lamp including the step of bombarding a fluorescent coating on an inner surface thereof in an atmosphere of dry oxygen, said fluorescent coating comprising a fluorescent tungstate.

12. A process of producing a fluorescent lamp including the step of bombarding a fluorescent coating on an inner surface thereof in an atmosphere of dry oxygen, said fluorescent coating comprising a fluorescent borate.

13. In the manufacture of fluorescent lamps, the steps of bombarding, by the passage of suitable currents therethrough, both a fluorescent coating therein and the electrodes thereof under conditions, more highly oxidizing than obtain when bombarding in air, said fluorescent coating comprising a fluorescent oxy-compound.

14. In the production of fluorescent lamps of the type comprising a sealed tube having spaced electrodes and interiorly coated with fluorescent pigment, the step of passing current therethrough while such tube contains a dry atmosphere more oxidizing than air, whereby to condition the fluorescent pigment.

15. In the production of fluorescent lamps of the type comprising a sealed tube having spaced electrodes and interiorly coated with fluorescent pigment, the step of passing current therethrough while said tube contains an atmosphere of dry oxygen, whereby to condition the fluorescent pigment without decomposition thereof.

16. The process recited in claim 14, wherein said fluorescent pigment comprises a fluorescent silicate.

17. The process recited in claim 14, wherein said fluorescent pigment comprises a zinc containing fluorescent silicate.

18. The process recited in claim 15 wherein said fluorescent pigment comprises a cadmium containing fluorescent silicate.

19. The process recited in claim 15 wherein the said fluorescent pigment comprises a zinc containing fluorescent silicate.

CARL F. SWINEHART.
HERMAN C. FROELICH.